United States Patent [19]
Watanabe et al.

[11] Patent Number: 5,919,864
[45] Date of Patent: Jul. 6, 1999

[54] THERMOPLASTIC ELASTOMER COMPOSITION

[75] Inventors: Jiro Watanabe; Osamu Ozawa; Noriaki Kuroda; Gou Kawaguchi, all of Hiratsuka, Japan

[73] Assignee: The Yokohama Rubber Co., Ltd., Tokyo, Japan

[21] Appl. No.: 09/035,930

[22] Filed: Mar. 6, 1998

Related U.S. Application Data

[63] Continuation of application No. 08/655,183, May 30, 1996, abandoned.

[30] Foreign Application Priority Data

Oct. 2, 1995 [JP] Japan ................................ 7-255221

[51] Int. Cl.$^6$ .......................... C08L 67/00; C08L 23/12
[52] U.S. Cl. .................. 525/166; 525/165; 525/166; 525/178; 525/179; 525/186; 525/199; 525/203; 525/205; 525/238; 525/240
[58] Field of Search ..................... 525/240, 160, 525/199, 98, 165, 166, 178, 179, 238, 186, 203, 205

[56] References Cited

U.S. PATENT DOCUMENTS

| | | | |
|---|---|---|---|
| 4,140,731 | 2/1979 | Nakamura et al. | 525/75 |
| 5,525,675 | 6/1996 | Masuda et al. | 525/194 |

*Primary Examiner*—Mark L. Warzel
*Attorney, Agent, or Firm*—Finnegan, Henderson, Farabow, Garrett & Dunner, L.L.P.

[57] ABSTRACT

A thermoplastic elastomer composition containing a thermoplastic resin component including 10 to 95% by weight of a polypropylene having a syndiotactic structure and an elastomer component and having a value of α, defined as follows, of 1 or less:

$$\alpha = (\phi d/\phi m) \times (\eta m/\eta d)$$

wherein the volume fraction of the thermoplastic resin component is φm, the melt viscosity thereof at the mixing conditions is ηm and the volume fraction of the elastomer component is φd, the melt viscosity thereof is ηd.

7 Claims, No Drawings

THERMOPLASTIC ELASTOMER COMPOSITION

This is a continuation of application Ser. No. 08/655,183, filed May 30, 1996, now abandoned, all of which are incorporated herein by reference.

BACKGROUND OF THE INVENTION

1. Field of the Invention

The present invention relates to a thermoplastic elastomer composition. More particularly it relates to a thermoplastic elastomer composition containing a syndiotactic polypropylene having more excellent rubber-like properties and heat resistance up to the high temperature region and useful for various applications where the use thereof at a high temperature region is required, such as hoses of automobiles, construction machinery, etc., sealing materials for automobiles, sheet materials for civil construction, sealing materials, and tire members.

2. Description of the Related Art

A thermoplastic elastomer has been known in the art and can be obtained by mixing an elastomer component with a thermoplastic resin. Further, thermoplastic elastomer composition has been known in the art and can be obtained by vulcanizing (or cross-linking) the elastomer component during the mixing process to dynamically cause vulcanization and secure a greater rubber elasticity. These have been noted as a polymer composition capable of giving the desired properties of the elasticity inherent to rubber and other inherent properties plus the thermoplastic moldability of a thermoplastic resin etc. The thermoplastic elastomer composition, however, is superior in heat resistance when a thermoplastic resin having a high heat deformation temperature is used, but has an excessively high Young's modulus and loses its rubber-like properties or flexibility. When an excessive amount of rubber is used, there was the problem that the processability of the elastomer composition as a thermoplastic material became poor. Conversely, when a resin having a low modulus of elasticity is used, since a resin generally also has a low heat deformation temperature, the rubber elasticity is improved, but the heat resistance (heat deformation resistance) becomes poor.

SUMMARY OF THE INVENTION

Accordingly, the objects of the present invention are to eliminate the above-mentioned problems in the prior art and to provide a thermoplastic elastomer composition having a higher heat deformation resistance and increased rubber elasticity compared with the conventional thermoplastic elastomer.

In accordance with the present invention, there is provided a thermoplastic elastomer composition comprising a thermoplastic resin component containing 10 to 95% by weight of a polypropylene having a syndiotactic structure and an elastomer component, wherein the composition has a value of $\alpha$, defined as follows, of 1 or less:

$$\alpha = (\phi d/\phi m) \times (\eta m/\eta d)$$

wherein the volume fraction of the thermoplastic resin component is $\phi m$ and the melt viscosity thereof at the mixing conditions is $\eta m$, and the volume fraction of the elastomer component is $\phi d$ and the melt viscosity thereof is $\eta d$.

BEST MODE FOR CARRYING OUT THE INVENTION

The constitution, mode of operation, and effect of the present invention will be explained in detail below.

The existence of syndiotactic polypropylenes has been known for a long time, but the method of low temperature polymerization using a conventional so-called Ziegler type catalyst composed of a vanadium compound and an ether and an organoaluminum compound is poor in syndiotacticity, which does not exhibit the features of a syndiotactic polypropylene at all. Especially, the copolymer of ethylene and propylene cannot be called a crystalline polypropylene. On the other hand, it was first discovered by J. A. Ewen et al. that a polypropylene having an excellent tacticity with a syndiotactic pentad fraction of more than 0.7 can be obtained by a catalyst composed of a transition-metal catalyst component having an asymmetric ligand and aluminoxane, that is, a so-called metallocene catalyst (J. Am. Chem. Soc., 110, 6255–6256, 1988).

As the catalyst suitable for synthesizing the polypropylene having a substantially syndiotactic structure to be mixed in the thermoplastic elastomer composition according to the present invention, the compounds described in the above-mentioned publication, can be exemplified. However, when producing a homopolymer of propylene, even with a different structure, it is possible to use a catalyst system giving a polymer having a relatively high tacticity of a syndiotactic pentad fraction of the resultant polymer of about 0.7 or more (A. Zambelli et al., Macromolecules, 6, 687 (1973), ibid 8, 925 (1975)). For example, a catalyst system composed of a transition-metal compound having an asymmetric ligand and an organoaluminum compound, i.e., a so-called metallocene catalyst system, is effective.

Examples of the suitable catalyst system are those described in the above-mentioned publication, such as isopropyl(cyclopentadienyl-1-fluorenyl)hafnium dichloride or isopropyl (cyclopentadienyl-1-fluorenyl)zirconium dichloride. Examples of the organoaluminum compounds are aluminoxane or an alkyl aluminum. Examples of the aluminoxane are an alkyl aluminum condensed by water. In particular, methyl aluminoxane, especially having a degree of condensation of at least 5, more preferably at least 10 can be effectively used.

The preferred ratio of aluminoxane to the above-mentioned transition-metal catalyst component is 10 to 1,000,000 times by moles, usually 50 to 5000 times by moles. Further, the combination of an alkyl aluminum and stable anions or compounds capable of generating the stable anions can be used.

The polymerization conditions are not particularly limited. For example the solvent polymerization method using an inert medium or the block polymerization method and vapor phase polymerization method with substantially no inert medium can be used. The polymerization temperature is preferably $-100$ to $200°$ C. and the polymerization pressure is preferably ordinary pressure to $100$ kg/cm$^2$. More preferably, these are $-100$ to $100°$ C. and ordinary pressure to $50$ kg/cm$^2$.

Further, during polymerization, it is possible to copolymerize 10% by weight or less of ethylene or an $\alpha$-olefin having at least 4 carbon atoms preferably 4 to 10, for example, butene-1, pentene-1, hexene-1, heptene-1, and 4-methylpentene-1, with at least 90% by weight of propylene. When the amount of ethylene or the $\alpha$-olefin is more than 10% by weight, the properties of the composition, for example, the heat deformation resistance and shapeability, become unpreferably poor.

The syndiotactic pentad fraction of the syndiotactic polypropylene used in the present invention is preferably at least 0.7, more preferably at least 0.85. When this is less than 0.7, the heat deformation resistance and the moldability and processability become inferior. In general thermoplastic resins, the heat deformation resistance and the flexibility are in inverse proportion to each other and as the heat deformation temperature rises, the resin comes to have rigid physical properties. However, a syndiotactic polypropylene synthesized by the above-mentioned method is a material having also a high heat deformation resistance together with flexibility and can be said to be the material most suitable for producing the present thermoplastic elastomer composition having a heat deformation resistance.

The thermoplastic resin component of the thermoplastic elastomer composition according to the present invention is composed of a blend of a polypropylene having a syndiotactic structure in an amount of 10 to 95% by weight, preferably 15 to 95% by weight, and any other thermoplastic resin. When the content of the polypropylene having the syndiotactic structure is less than 10% by weight, the composition becomes deficient in flexibility and heat deformation resistance, whereas when the content is more than 95% by weight, control of the heat resistance and other desired properties (e.g., oil resistance, air permeation resistance, etc.) becomes insufficient.

Examples of the other thermoplastic resin constituting the thermoplastic elastomer composition of the present invention are the following thermoplastic resins and any mixtures thereof or including these:

Polyolefin resins (for example, high density polyethylene (HDPE), ultrahigHDPE), ultrahigh molecular weight polyethylene (UHMWPE), isotactic polypropylene, ethylene-propylene copolymer resin), polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, nylon 66/PPS copolymers), polyester resins (for example, polybutylene terephthalate (PBT), polyethylene terephthalate (PET), polyethylene isophthalate (PEI), PET/PEI copolymers, polyacrylate (PAR), polybutylene naphthalate (PBN), liquid crystal polyesters, polyoxyalkylene diimide acid/polybutylate terephthalate copolymers, and other aromatic polyesters), polynitrile resins (for example, polyacrylonitrile (PAN), polymethacrylonitrile, acrylonitrile/styrene copolymers (AS), methacrylonitrile/styrene copolymers, methacrylonitrile/styrene/butadiene copolymers), ethyl polymethacrylate) polyvinyl resins (for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methylacrylate copolymers), cellulose resins (for example, cellulose acetate and cellulose acetate lactate), fluororesins (for example, polyvinylidene fluoride (PVDF), polyvinyl fluoride (PVF), polychlorotrifluoroethylene (PCTFE), tetrafluoroethylene/ethylene copolymers (ETFE), imide resins (for example, aromatic polyimides (PI)), etc.

Examples of the elastomer component constituting the thermoplastic elastomer composition according to the present invention are the following elastomers and any mixtures thereof or containing these as main ingredients:

Diene rubbers and their hydrogenated products (for example, NR, IR, epoxylated natural rubber, SBR, BR (high cis-BR and low cis-BR), NBR, hydrogenated NBR, hydrogenated SBR), olefin rubbers (for example, ethylene propylene rubbers (EPDM, EPM), maleic acid modified ethylene propylene rubber (M-EPM), IIR, isobutylene and aromatic vinyl or diene monomer copolymers, acryl rubbers (ACM), ionomers), halogenated rubbers (for example, Br-IIR, Cl-IIR, brominated isobutylene-paramethyl styrene copolymers (Br-IPMS), CR, chlorohydrin rubber (CHR), chlorosulfonated polyethylene (CSM), chlorinated polyethylene (CM), maleic acid modified chlorinated polyethylene (M-CM), silicone rubbers (for example, methyl vinyl silicone rubber, dimethyl silicone rubber, methyl phenyl vinyl silicone rubber), sulfonated rubbers (for example, polysulfide rubber), fluororubbers (for example, vinylidene fluoride rubber, fluoro vinyl ether rubber, tetrafluoroethylene-propylene rubber, fluorosilicone rubber, fluorophosphagen rubber), and thermoplastic elastomers (for example, styrene elastomers, olefin elastomers, ester elastomers, urethane elastomers, polyamide elastomers).

The ratio of the thermoplastic resin component and elastomer component constituting the thermoplastic elastomer composition according to the present invention is not particularly limited, but preferably is a thermoplastic resin component:elastomer component ratio of 90:10 to 15:85. When the amount of the thermoplastic resin component is too large, there is a tendency of the rubber elasticity of the thermoplastic elastomer composition obtained to be excessively lost and the heat softening resistance to be lost, whereas when the amount is too small, the thermoplastic resin serving as the continuous phase and the elastomer component serving as the dispersion phase reverse, and therefore, the thermoplastic elastomer composition thus prepared does not exhibit the fluidity of a thermoplastic resin and cannot be molded.

It is possible to optionally add to the above-mentioned elastomer component or thermoplastic resin component necessary amounts of blending agents usually added to elastomers to improve the fluidity, heat resistance, physical strength, cost, etc. of the thermoplastic elastomer composition, for example, a reinforcing agent, filler, softening agent, antioxidant, and processing adjuvant.

When the chemical compatibilities of a specific thermoplastic resin component and elastomer component differ, it is preferable to cause compatibility between the two by using a suitable compatibilizing agent as a third component. By mixing a compatibilizing agent into the system, the interfacial tension between the thermoplastic resin component and elastomer component falls and, as a result, the size of the elastomer (or rubber) particles forming the dispersion phase becomes very small, and therefore, the properties of the two components are more effectively expressed. The compatibilizer may generally be made one of a structure of a copolymer having the structure of one or both of the thermoplastic resin component and elastomer component or a copolymer having an epoxy group, carboxyl group, carbonyl group, halogen group, amine group, oxazoline group, hydroxyl group, etc. reactable with the thermoplastic resin component or elastomer component. These may be selected depending upon the type of the thermoplastic resin component and elastomer component to be mixed. Examples thereof are styrene-ethylene-butylene-styrene block copolymers (SEBS) and their maleic acid modified products, EPDM and EPM and their maleic acid modified products, EPDM/styrene or EPDM/acrylonitrile graft copolymers and their maleic acid modified products, styrene/maleate copolymers, etc. The amount of the compatibilizer mixed in is not particularly limited, but preferably is 0.5 to 10 parts by weight per 100 parts by weight of the polymer component (sum of thermoplastic resin and elastomer).

In the present invention, it is necessary to knead at a volume fraction, defined as follows, of 1.0 or less:

$$\alpha=(\phi d/\phi m)\times(\eta m/\eta d)$$

wherein the volume fraction of the thermoplastic resin component including the syndiotactic polypropylene and forming the continuous phase (so-called matrix phase) is $\phi m$, and the melt viscosity thereof at the time of melt kneading is $\eta m$, and the volume fraction of the elastomer component forming the dispersion phase (so-called domain phase) is $\phi d$ and the viscosity thereof under the same conditions is $\eta d$. This is because when the value of the above-mentioned $\alpha$ is less than 1 the microstructure of the thermoplastic elastomer composition thus produced has the thermoplastic resin component as the continuous phase (matrix) and the elastomer component as the dispersion phase (domain), and therefore, shaping is possible depending upon the methods of shaping of thermoplastic resins, but when $\alpha$ is 1 or more, the continuous phase and dispersion phase end up being reversed, and therefore, the thermoplastic elastomer composition thus produced does not exhibit the fluidity of a thermoplastic resin and accordingly cannot be molded by a molding machine for a resin.

The thermoplastic elastomer composition of the present invention may be produced by melt kneading a thermoplastic resin component containing at least 10% by weight and not more than 95% by weight of a syndiotactic polypropylene and an elastomer component (i.e., unvulcanized in the case of rubber) by a biaxial kneader/extruder etc. to disperse the elastomer component in the thermoplastic resin component forming the continuous phase. At this time, the mixing of the syndiotactic polypropylene and other thermoplastic resins may be performed in advance by an extruder etc. Further, dry blending may be performed in the pellet state and the three components may be simultaneously or consecutively separately kneaded at the time of mixing with the elastomer component. When vulcanizing the elastomer component, it is also possible to add the vulcanizing agent while kneading so as to effect dynamic vulcanization of the elastomer component.

The vulcanizing agent, vulcanization adjuvant, vulcanization conditions (temperature, time) etc. for the vulcanization of the elastomer component used in the thermoplastic elastomer composition of the present invention may be suitably determined depending upon the composition of the elastomer component added and are not particularly limited. As the vulcanizing agent, a general rubber vulcanizing agent (or cross-linking agent) may be used. Specifically, examples of the sulfur type vulcanizing agent are powdered sulfur, precipitated sulfur, high dispersing sulfur, colloidal sulfur, insoluble sulfur, dimorpholine disulfide, alkylphenol disulfide, etc. For example, 0.5 to 4 phr (parts by weight per 100 parts by weight of elastomer component (polymer)) may be used.

Further, examples of an organoperoxide type vulcanizing agent are benzoylperoxide, t-butylhydroperoxide, 2,4-dichlorobenzoylperoxide, 2,5-dimethyl-2,5-di(t-butylperoxy)hexane, 2,5-dimethylhexane-2,5-di (peroxylbenzoate), etc. For example, 1 to 15 phr or so may be used. Further, examples of a phenol resin based vulcanizing agent are of a brominated alkylphenol resin or a mixed cross-linking system containing stannous chloride, chloroprene or other halogen donors and an alkylphenol resin. For example, about 1 to 20 phr can be used.

As other agents, zinc white (a ZnO) (about 5 phr), magnesium oxide (about 4 phr), litharge (about 10 to 20 phr), p-quinone dioxime, p-dibenzoylquinone dioxime, tetrachloro-p-benzoquinone, poly-p-dinitrosobenzene (about 2 to 10 phr), and methylene dianiline (about 0.2 to 10 phr) may be exemplified.

Further, optionally, it is also possible to add a vulcanization accelerator. As the vulcanization accelerator, an aldehyde ammonia based, guanidine based, thiazole based, sulfenamide based, thiuram based, dithio acid salt based, thiourea based, or other general vulcanization accelerators may be used in an amount of 0.5 to 2 phr or so.

Specifically, as the aldehyde ammonia based vulcanization accelerator includes hexamethylene tetramine etc.;

the guanidine based vulcanization accelerator includes diphenylguanidine etc.;

the thiazole based vulcanization accelerator includes dibenzothiazyldisulfide (DM), 2-mercaptobenzothiazole and its Zn salt, cyclohexylamine salts, etc.;

the sulfenamide based vulcanization accelerator includes cyclohexylbenzothiazylsulfene amide (CBS), N-oxydiethylenebenzothiazyl-2-sulfenamide, N-t-butyl-2-benzothiazolesulfenamide, 2-(thymolpolynyldithio) benzothiazole, etc.;

the thiuram based vulcanization accelerator includes tetramethylthiuram disulfide (TMTD), tetraethylthiuram disulfide, tetramethylthiuram monosulfide (TMTM), dipentamethylenethiuram tetrasulfide, etc.;

the dithio acid salt based vulcanization accelerator includes Zn-dimethyldithio carbamate, Zn-diethyldithio carbamate, Zn-di-n-butyldithio carbamate, Zn-ethylphenyldithio carbamate, Tc-diethyldithio carbamate, Cu-dimethyldithio carbamate, Fe-dimethyldithio carbamate, pipecoline pipecoryl dithiocarbamate, etc.; and the thiourea based vulcanization accelerator includes ethylene thiourea, diethyl thiourea, etc.

Further, the vulcanization accelerator usable in the present invention includes a general rubber-use adjuvant. For example, zinc white (about 5 phr) or stearic acid and oleic acid and Zn salts of the same (about 2 to 4 phr) may be used.

The various additives (except for the vulcanizing agent) may be added to the thermoplastic resin component or the elastomer component during the above-mentioned kneading step, but it is preferable to mix them, in advance, before the kneading. The kneader used for kneading the thermoplastic resin component and the elastomer component is not particularly limited. For example, a screw extruder, kneader, Banbury mixer, biaxial kneader/extruder, etc. may be used. Among these, it is preferable to use a biaxial kneader/extruder for the kneading of the thermoplastic resin component and elastomer component and for the dynamic vulcanization of the elastomer component. Further, two or more types of kneaders may be used for successive kneading. As a condition of the melt kneading, the temperature should be at least the temperature at which the thermoplastic resin component melts. Further, the shear rate during the kneading is preferably 1000 to 7500 $sec^{-1}$. The time of the overall kneading process is preferably from 30 seconds to 10 minutes and, when a vulcanizing agent is used, from 15 seconds to 5 minutes. The thermoplastic elastomer composition kneaded and produced by the above-mentioned method may be molded by the usual molding methods for thermoplastic resin such as injection molding or extrusion.

The thermoplastic elastomer composition of the present invention produced by the above-mentioned method has a flexibility of not more than 150 MPa in terms of the Young's modulus and a high heat resistance for a fluidization starting temperature of 150° C. or more.

EXAMPLES

The present invention will now be further explained in detail, but is by no means limited to, the following Examples and Comparative Examples.

Examples 1 to 11 and Comparative Examples 1 to 3

1. Synthesis of Syndiotactic Polypropylene

Isopropylcyclopentadienyl-1-fluorene synthesized in accordance with a conventional method was lithiumized and made to react with zirconium tetrachloride, followed by recrystallization. A 0.2 g amount of the resultant isopropyl (cyclopentadienyl-1-fluorenyl)zirconium dichloride and 30 g of methyl aluminoxane made by Toyo Akzo Co., Ltd. (polymerization degree 16.1) were used and polymerized in an autoclave of an inner capacity of 200 liters at a polymerization pressure of 3 kg/cm$^2$-G at 20° C. for 2 hours. After polymerization, the unreacted propylene was purged, and, the polymerization mixture was washed by an aqueous solution of hydrochloride acid, then filtered to obtain 5.6 kg of syndiotactic polypropylene. This polypropylene had a syndiotactic pentad fraction of 0.935 according to $^{13}$C-NMR.

2. Preparation of Elastomer Component

Rubber and various additives were charged into a sealed type Banbury mixer in accordance with the formulation of a master batch shown in Table I and were mixed at 150° C. for 5 minutes to prepare the elastomer component. Next, the elastomer component was formed into a sheet of a thickness of 2.5 mm by a roll for rubber and then pelletized using a pelletizer for rubber use in the kneading with the thermoplastic resin component using a biaxial kneader/extruder.

TABLE I

| | (Parts by weight) Master Batch (MB) | | | | | |
|---|---|---|---|---|---|---|
| | 1 | 2 | 3 | 4 | 5 | 6 |
| SBR*[1] | 100 | — | — | — | — | — |
| Br-IIR*[2] | — | 100 | — | — | — | — |
| NBR*[3] | — | — | 100 | — | — | — |
| CM*[4] | — | — | — | 100 | — | — |
| EPDM*[5] | — | — | — | — | 100 | — |
| ACM*[6] | — | — | — | — | — | 100 |
| GPF*[7] | 60 | 60 | 60 | 60 | 60 | 60 |
| Stearic acid*[8] | 2 | 2 | 2 | 2 | 2 | 2 |
| Paraffinic process oil*[9] | 10 | 10 | 10 | 10 | 10 | 10 |

*[1]: SBR (Nipol 1502) (Nippon Zeon)
*[2]: Br-IIR (Bromobutyl 2244) (Exxon)
*[3]: NBR (Nipol 1043) (Nippon Zeon)
*[4]: CM (Elaslene 401AE) (Showa Denko)
*[5]: EPDM (EPT 3045) (Mitsui Petrochemical Industries)
*[6]: ACM (Nipol AR71) (Nippon Zeon)
*[7]: GPF (Seast V) (Tokai Carbon)
*[8]: Stearic acid (Bead Stearic Acid NY) (Nippon Yushi)
*[9]: Paraffinic process oil (Machine Oil 22) (Showa Shell Sekiyu)

3. Preparation of Thermoplastic Elastomer

A syndiotactic polypropylene and other thermoplastic resin were dry-blended. The resultant product was used as the thermoplastic resin component which was charged to a first charging port of a biaxial extruder and blended, then the elastomer component was charged from a second charging port to be added to and mixed with the thermoplastic resin component. Next, the vulcanization mixture was charged from a third charging port, and the result was kneaded and extruded at a kneading temperature of 210° C. and a shear rate of 1150S$^{-1}$ into a strand shape. The strands were cooled by water, then pelletized by a resin pelletizer to obtain the thermoplastic elastomer composition.

4. Measurement of Physical Properties

The physical properties of the resultant composition or thermoplastic resin component or elastomer component were measured by the following methods. The results are shown in Table II.

(1) Melt Viscosity

A syndiotactic polypropylene and other thermoplastic resin component were melt kneaded in the ratios shown in the examples and comparative examples at 210° C. in advance in a small-sized monoaxial extruder and pelletized to form the thermoplastic component.

Next, the melt viscosities (unit: poise) of the thermoplastic resin component prepared in the above-mentioned manner and the elastomer component (excluding vulcanization mixture) were measured by a capillary rheometer at a shear rate of 1150S$^{-1}$ and temperature of 210° C. using an orifice of 1 mm diameter×10 mm length.

(2) Tensile Strength, Elongation, Young's Modulus

Pellets of the thermoplastic elastomer composition prepared above were molded into a sheet of a thickness of 0.5 mm by a hot press. The sheet was then punched into No. 3 dumbbell shapes which were used to measure the physical properties according to JIS K 6251. The Young's modulus at that time was found from the inclination of a tangent drawn with respect to the curve of the initial strain region of the resultant stress-strain curve.

(3) Fluidization Starting Temperature

The temperature when fluidization started was measured in a "Koka" type flow tester under a load of 10 kgf/cm$^2$ applied to the thermoplastic elastomer composition and raising the temperature by a rate of temperature rise of 5° C.

(4) Melt Index (MI)

This was measured according to JIS K 7210 under a load of 2.16 kgf at 230° C.

The additives used in the Examples and Comparative Examples of the present invention were as follows:

ZnO: Zinc White No. 3 (Seido Kagaku)

Sulfur: Powdered Sulfur (Karuizawa Seirensho)

Trimercaptotriazine: ZISNET-F (Sankyokasei)

DM: Nocceler DM (Ouchi Shinkyo Kagaku)

MDCA: 2-mercaptobenzothiazoledicyclohexylamine salt (Ouchi Shinkyo Kagaku)

Zn St: Zinc stearate (Seido Kagaku)

Butane tetracarboxylic acid: BTC (Mitsui Toatsu Fine)

Nylon 6: Amilan CM1010 (Toray)

PBT: Ultradur B4500 (BASF)

Isotactic PP: MJ170 (Tokuyama)

TABLE II

| | Ex. 1 | Ex. 2 | Ex. 3 | Comp. Ex. 1 | Ex. 4 | Ex. 5 | Ex. 6 | Ex. 7 | Ex. 8 | Ex. 9 | Ex. 10 | Ex. 11 | Comp. Ex. 2 | Comp. Ex. 3 |
|---|---|---|---|---|---|---|---|---|---|---|---|---|---|---|
| Formulation (parts by weight) | | | | | | | | | | | | | | |
| Thermoplastic resin component (matrix phase) | | | | | | | | | | | | | | |
| Syndiotactic PP | 40 | 25 | 20 | 15 | 25 | 25 | 25 | 25 | 25 | 25 | 40 | 10 | 0 | 0 |
| Nylon 6 | 40 | 25 | 20 | 15 | 25 | 25 | 25 | 25 | 25 | — | 10 | 40 | 50 | — |
| PBT | — | — | — | — | — | — | — | — | — | 25 | — | — | — | — |
| Isotactic PP | — | — | — | — | — | — | — | — | — | — | — | — | — | 50 |
| Elastomer component (dispersion phase) | | | | | | | | | | | | | | |
| MB1 | 20 | 50 | 60 | 70 | — | — | — | — | — | 50 | 50 | 50 | 50 | 50 |
| MB2 | — | — | — | — | 50 | — | — | — | — | — | — | — | — | — |
| MB3 | — | — | — | — | — | 50 | — | — | — | — | — | — | — | — |
| MB4 | — | — | — | — | — | — | 50 | — | — | — | — | — | — | — |
| MB5 | — | — | — | — | — | — | — | 50 | — | — | — | — | — | — |
| MB6 | — | — | — | — | — | — | — | — | 50 | — | — | — | — | — |
| Vulcanization system | | | | | | | | | | | | | | |
| ZnO | 0.35 | 0.87 | 1.05 | 1.22 | 0.87 | 0.87 | — | 0.87 | — | 0.87 | 0.87 | 0.87 | 0.87 | 0.87 |
| Sulfur | 0.23 | 0.58 | 0.7 | 0.81 | 0.58 | 0.58 | — | 0.58 | — | 0.58 | 0.58 | 0.58 | 0.58 | 0.58 |
| Zn St | — | — | — | — | — | — | — | — | — | — | — | — | — | — |
| Trimercaptotriazine | — | — | — | — | — | — | 0.44 | — | — | — | — | — | — | — |
| DM | 0.12 | 0.29 | 0.35 | 0.41 | 0.29 | 0.29 | — | 0.29 | — | 0.29 | 0.29 | 0.29 | 0.29 | 0.29 |
| MDCA | — | — | — | — | — | — | 0.44 | — | — | — | — | — | — | — |
| Butane tetracarboxylic acid | — | — | — | — | — | — | — | — | 0.58 | — | — | — | — | — |
| Volume percentage | | | | | | | | | | | | | | |
| φd | 0.2 | 0.5 | 0.6 | 0.7 | 0.48 | 0.49 | 0.44 | 0.48 | 0.47 | 0.51 | 0.48 | 0.51 | 0.53 | 0.56 |
| φm | 0.8 | 0.5 | 0.4 | 0.3 | 0.52 | 0.51 | 0.56 | 0.52 | 0.53 | 0.49 | 0.52 | 0.49 | 0.47 | 0.44 |
| Melt viscosity | | | | | | | | | | | | | | |
| ηd (poise) | 2000 | 2000 | 2000 | 2000 | 1300 | 2400 | 3100 | 1500 | 1400 | 2000 | 2000 | 2000 | 2000 | 2000 |
| ηm (poise) | 1200 | 1200 | 1200 | 1200 | 1200 | 1200 | 1200 | 1200 | 1200 | 1400 | 1400 | 1100 | 1000 | 1200 |
| α value | | | | | | | | | | | | | | |
| α | 0.15 | 0.59 | 0.89 | 1.38 | 0.87 | 0.49 | 0.31 | 0.72 | 0.77 | 0.73 | 0.64 | 0.58 | 0.56 | 0.76 |
| Physical properties | | | | | | | | | | | | | | |
| Tensile strength (MPa) | 23.5 | 21.8 | 18.8 | Not mixable | 17.1 | 27.1 | 23.1 | 22.1 | 18.1 | 20.1 | 18.2 | 23.1 | 26.5 | 25.1 |
| Elongation (%) | 490 | 460 | 360 | | 535 | 510 | 398 | 383 | 366 | 440 | 460 | 410 | 380 | 360 |
| Young's modulus (MPa) | 155 | 82 | 65 | | 70 | 62 | 58 | 59 | 63 | 68 | 61 | 160 | 260 | 220 |
| Fluidization starting temperature (° C.) | 216 | 215 | 215 | | 216 | 213 | 214 | 216 | 211 | 220 | 161 | 218 | 220 | 146 |
| MI (g/10 min) | 3.3 | 2.3 | 1.8 | | 2.1 | 1.9 | 2.1 | 2 | 2.2 | 1.6 | 2.1 | 3.1 | 3.8 | 3.6 |

When the product α of the ratio of volume and ratio of viscosity of the thermoplastic resin component and the elastomer component is more than 1 as in Comparative Example 1, the phase structure of the thermoplastic elastomer produced reverses and the elastomer component ends up becoming the matrix, so the elastomer component vulcanizes (cross-links) while adding the vulcanization system dynamically, i.e., so-called "scorching" occurs, and therefore mixing becomes impossible.

On the other hand, even when α is not more than 1, when using only nylon 6 or other high heat resistant, high Young's modulus material as the thermoplastic resin component, the thermoplastic elastomer produced (Comparative Examples 2 and 3) will be high in heat resistance, but also will be high in Young's modulus and will lack flexibility as an elastomer.

Contrary to the above, a thermoplastic elastomer composition using as a matrix a thermoplastic resin component including a syndiotactic polypropylene greatly reduces the Young's modulus while maintaining the heat resistance thereof and has flexibility.

Further, the type of the elastomer component is not limited. For example, any substance which can constitute the thermoplastic elastomer and has a vulcanization mixture suitable for the elastomer component (Examples 4 to 8) can be used.

Accordingly, the thermoplastic resin component other than the syndiotactic polypropylene and the elastomer component should be suitably selected to give the necessary performance according to the application of the thermoplastic elastomer composition.

As shown by the results of Table II, according to the present invention, it is possible to obtain a rubber composition having a high heat deformation resistance and rubber-like behavior by mixing a thermoplastic resin component containing 10 to 95% by weight of syndiotactic polypropylene and a rubber component.

We claim:

1. A thermoplastic elastomer composition comprising (a) 15–90 parts by weight of a thermoplastic resin component which is a blend of 10 to 95% by weight of a syndiotactic polypropylene having a syndiotactic pentad fraction of at least 0.7 and a remainder portion of thermoplastic resin other than the syndiotactic polypropylene and (b) 85-10 parts by weight of an elastomer component, said composition having a value of α, defined as follows, of less than 1:

$$\alpha=(\phi d/\phi m)\times(\eta m/\eta d)$$

wherein the volume fraction of the thermoplastic resin component is φm and the melt viscosity thereof at the mixing condition is ηm, and the volume fraction of the elastomer component is φd and the melt viscosity thereof is ηd, said melt viscosities being measured by a capillary rheometer at a shear rate of 1150 s$^{-1}$ and a temperature of 210° C. using an orifice of 1 mm diameter and 10 mm length.

2. The thermoplastic elastomer composition as claimed in claim 1, wherein said syndiotactic polypropylene is composed of 90% by weight or more of propylene and 10% by weight or less of at least one α-olefin.

3. The thermoplastic elastomer composition as claimed in claim 1, wherein the pentad fraction of the syndiotactic polypropylene is at least 0.85.

4. The thermoplastic elastomer composition as claimed in claim 1, wherein said elastomer component is selected from the group consisting of diene rubber, hydrogenated rubber, olefin rubber, halogenated rubber, silicone rubber, sulfonated rubber, fluoro rubber, thermoplastic rubber.

5. The thermoplastic elastomer composition as claimed in claim 1, wherein the thermoplastic resin other than the syndiotactic polypropylene is selected from the group consisting of polyamide resins, polyester resins, polynitrile resins, polyvinyl resins, fluororesins and polyimide resins.

6. The thermoplastic elastomer composition as claimed in claim 1, wherein the thermoplastic resin is a polyamide resin or polyester resin.

7. The thermoplastic elastomer composition as claimed in claim 1, further including a vulcanizing agent selected from the group consisting of sulfur-containing vulcanizing agents and phenol resin based vulcanizing agents.

* * * * *